United States Patent [19]

Sukup

[11] Patent Number: 5,520,495

[45] Date of Patent: May 28, 1996

[54] METHOD AND MEANS FOR FILLING FIELD PLANTERS FROM BULK SEED CONTAINERS

[75] Inventor: Eugene G. Sukup, Sheffield, Iowa

[73] Assignee: Sukup Manufacturing Company, Sheffield, Iowa

[21] Appl. No.: 205,883

[22] Filed: Mar. 3, 1994

[51] Int. Cl.$^6$ ............................................. B65G 67/24
[52] U.S. Cl. ........................................ 414/523; 414/504
[58] Field of Search .................................. 414/403, 414, 414/501, 503, 504, 505, 523, 526; 212/224, 238

[56] References Cited

U.S. PATENT DOCUMENTS

| | | | |
|---|---|---|---|
| 2,293,486 | 8/1942 | Barrett | 414/523 |
| 2,452,267 | 10/1948 | Schramm . | |
| 2,540,100 | 2/1951 | Coeur . | |
| 2,589,988 | 3/1952 | Bruno . | |
| 2,703,554 | 3/1955 | Haggard et al. . | |
| 2,758,732 | 8/1956 | Herzog et al. | 414/504 |
| 2,994,446 | 8/1961 | Van Auwelaer et al. | 212/238 |
| 3,091,476 | 5/1963 | Blake . | |
| 3,432,053 | 3/1969 | Vereschagin | 414/523 |
| 3,467,265 | 9/1969 | Miskin et al. | 414/523 |
| 3,536,339 | 10/1970 | Fichtenberg . | |
| 3,642,155 | 2/1972 | Carlson | 414/504 |
| 4,178,123 | 12/1979 | Loeffler | 414/523 |
| 4,571,143 | 2/1986 | Hellerich | 414/523 |
| 5,108,249 | 4/1992 | Kinzenbaw et al. . | |
| 5,257,893 | 11/1993 | Sevits | 414/523 |

FOREIGN PATENT DOCUMENTS 917755  4/1982  U.S.S.R. ................................ 414/503

*Primary Examiner*—David A. Bucci
*Assistant Examiner*—Thomas J. Brahan
*Attorney, Agent, or Firm*—Zarley, McKee, Thomte, Voorhees, & Sease

[57] ABSTRACT

The method of this invention comprises the loading of a rectangular bulk seed container onto a transport vehicle; moving the vehicle to a field location adjacent a field planter; opening the seed container so that the bulk seed will flow by gravity into an elongated conveyer means on the vehicle; moving the conveyer with respect to the vehicle so that the conveyer can discharge seed into a plurality of hoppers on the field planter; and operating the conveyer so that the seed will flow continuously from the container through the conveyer and into the hoppers. The apparatus of this invention comprises a vehicle frame having a lower horizontal seed container support platform and a substantially vertical side frame extending upwardly from the support platform. An inclined auger conveyer is swingably secured to the side frame and is movable from a travel position adjacent the side frame to an angular unloading position with respect to the side frame. The conveyer has a lower inlet end and an upper discharge end,, A track is mounted on the side frame and is connected to the conveyer to permit the conveyer to be moved longitudinally with respect to the side frame. A power means on the vehicle frame is connected to the conveyer for operating the conveyer and for moving the conveyer with respect to the side frame.

10 Claims, 2 Drawing Sheets

METHOD AND MEANS FOR FILLING FIELD PLANTERS FROM BULK SEED CONTAINERS

BACKGROUND OF THE INVENTION

Field seeds from hybrid seed companies are normally packaged in bags containing a bushel or so of seed. With modern row crop planters having the capability of planting eight to twelve or more rows at a time, vast quantities of seed are consumed in the course of a planting day. As a result, the farmer operating the planter has to interrupt the planting operation frequently in the course of a day to refill the hoppers on the planter. Typically, each individual seed bag is opened and the contents are dumped into the hoppers on the planter. Some efforts have been made to dump a plurality of bags into an enlarged hopper or wagon, and then conveying the seed from the common source to the individual hoppers on the planter. However, this process necessitates the opening of a plurality of relatively small bags of seed.

In recent times, large rectangular containers containing approximately 2,000 pounds of seed have been designed to avoid the problems of having to open a plurality of smaller seed bags. However, these bulk seed containers which are filled by the companies producing the seed present an additional problem of handling, transportation, and unloading. These bulk seed containers normally have an outlet port and a tapered floor within whereby the grain will flow by gravity out of tile outlet port when the outlet port is opened.

It is therefore a principal object of this invention to provide a method and means for filling the hoppers of seed planters from the bulk seed containers.

A further object of this invention is to facilitate the transportation of the bulk seed containers from a delivery location out to the field where the planter is located.

A further object of this invention is to provide a vehicle for transporting the bulk seed containers, and for unloading the seed containers into the hoppers of the planter after the vehicle has been moved to the field location where the planter is situated.

It is a still further object of this invention to provide a vehicle for filling the hoppers of field planters from bulk containers wherein the hoppers of the planters can be easily filled from the bulk containers without having to move the vehicle supporting the bulk containers each time a different hopper is filled.

These and other objects will be apparent to those skilled in the art.

SUMMARY OF THE INVENTION

The method of this invention comprises the loading of a rectangular bulk seed container onto a transport vehicle; moving the vehicle to a field location adjacent a field planter; opening the seed container so that the bulk seed will flow by gravity into an elongated conveyer means on the vehicle; moving the conveyer with respect to the vehicle so that the conveyer can discharge seed into a plurality of hoppers on the field planter; and operating the conveyer so that the seed will flow continuously from the container through the conveyer and into the hoppers.

The apparatus of this invention comprises a vehicle frame having a lower horizontal seed container support platform and a substantially vertical side frame extending upwardly from the support platform. An inclined auger conveyer is swingably secured to the side frame and is movable from a travel position adjacent the side frame to an angular unloading position with respect to the side frame. The conveyer has a lower inlet end and an upper discharge end. A track is mounted on the side frame and is connected to the conveyer to permit the conveyer to be moved longitudinally with respect to the side frame. A power means on the vehicle frame is connected to the conveyer for operating the conveyer and for moving the conveyer with respect to the side frame.

DESCRIPTION OF THE PREFERRED EMBODIMENT

Figure 1:
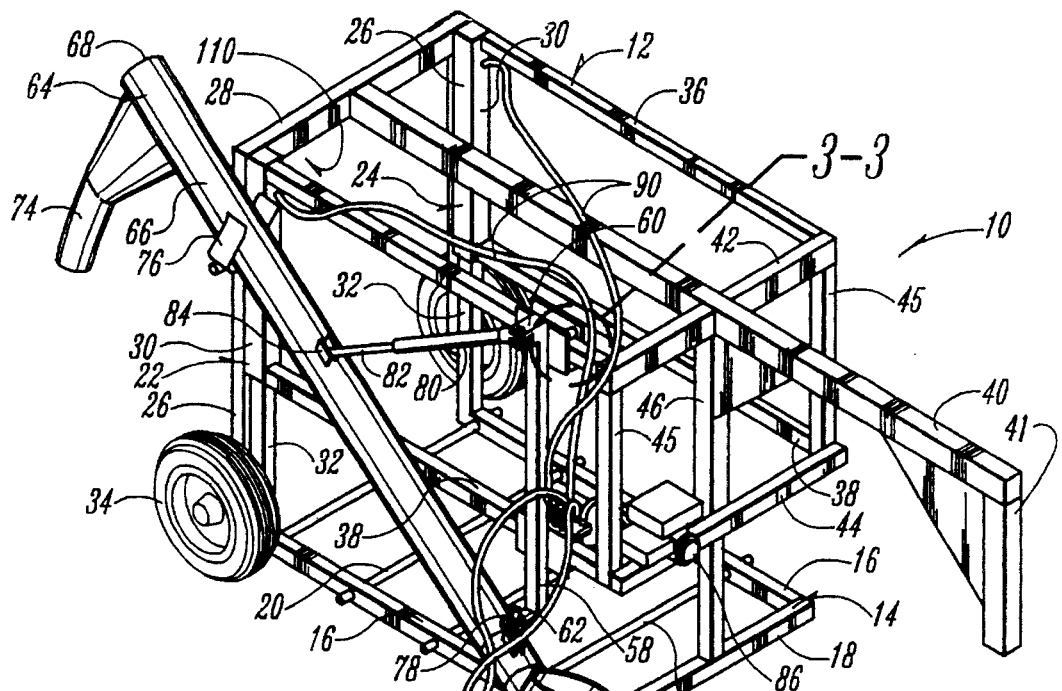
FIG. 1 is a perspective view of the vehicle of this invention.
Figure 3:
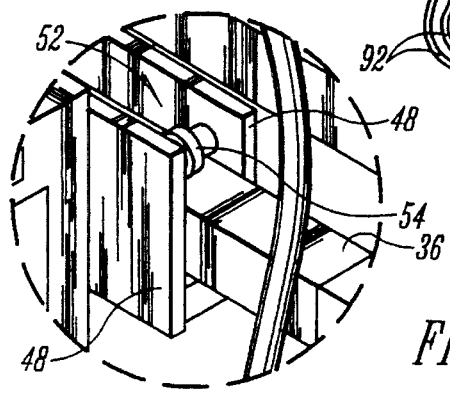
FIG. 3 is an enlarged scale sectional view taken on line 3—3 of FIG. 1.

The numeral 10 designates the vehicle of this invention having a frame 12 and a rectangular shaped support platform 14, Platform 14 is comprised of side members 16 and a front member 18, Cross members 20 extend between side members 16.

Side frames 22 and 24 extend upwardly from platform 14, Corner posts 26 extend upwardly from the rearward end of side members 16 and the upper ends thereof are connected by top member 28, Cylinder posts 30 are positioned adjacent corner posts 26 and have lower ends 32 which extend telescopically downwardly to be connected to ground support wheels 34. Wheels 34 engage and support the vehicle on ground surface 35.

The side frames 22 further comprise upper horizontal rails 36 which are spaced from lower horizontal rails 38, A center beam 40 extends from the center of top member 28 and terminates in a forwardly extending tongue 41 which can be connected to either a truck or a tractor for towing purposes, Cross members 42 extend laterally from center beam 40 and are connected to the forward ends of upper rails 36, A cross member 44 extends horizontally between the forward ends of lower rails 38, Vertical posts 45 extend between the forward ends of rails 38 and 40, A center post 46 extends between the inner section of beam 40 and cross members 42, and thence downwardly to the center of front member 18 on support platform 14.

An upper U-shaped carriage bracket 48 is movably mounted on upper rail 36, and a similar U-shaped carriage bracket 50 is movably mounted on the lower rail 38. Each bracket has an open upper end 52 with rollers 54 extending between the sidewalls 56 thereof.

A vertical post 58 is secured by its ends to brackets 48 and 50. A clevis 60 is mounted on the upper end of vertical post 58, and a clevis 62 is secured to the lower end thereof.

A conventional auger conveyer 64 including auger tube 66 has an upper end 68 and a lower end 70. Conveyer 64 has an inlet port 72 at its lower end and an outlet spout 74 secured to its upper end. A U-shaped bracket 76 is secured to corner post 26 to support the auger conveyor 64 in its transport position.

Figure 2:
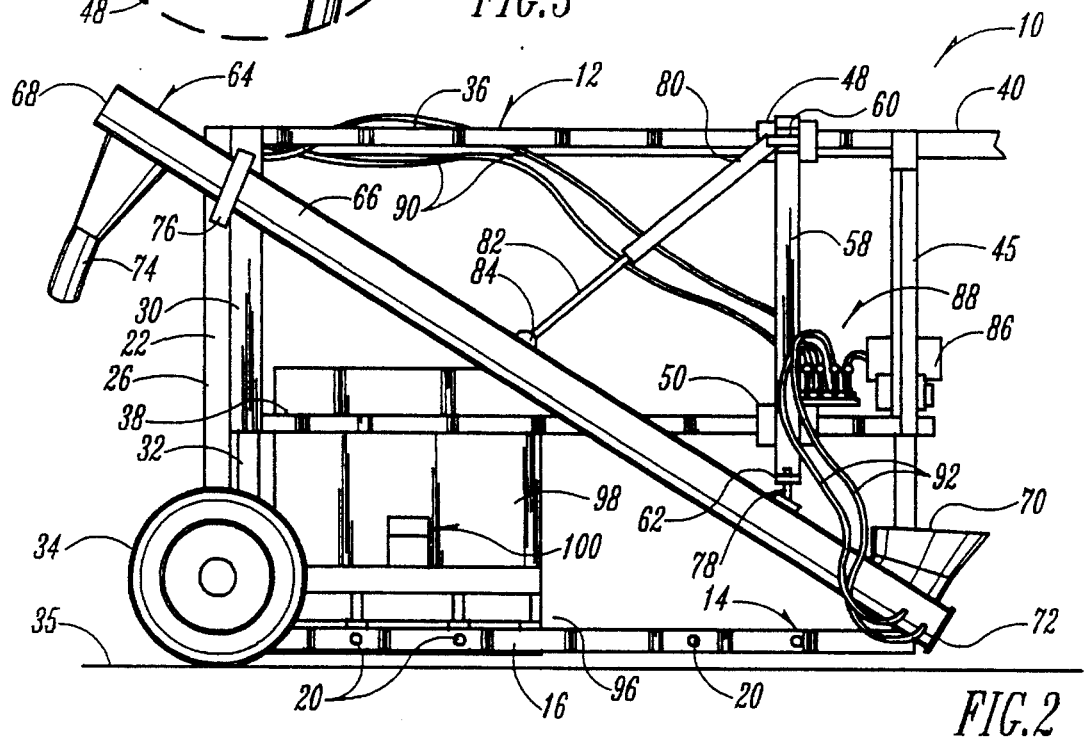
FIG. 2 is an enlarged scale side elevational view of the device of FIG. 1 with the vehicle being shown in its loading position.

With reference to FIG. 2 a swivel connection 78 connects the lower end of post 58 with the auger tube 66. A hydraulic cylinder 80 is pivotally and swingably connected to clevis 60 at the upper end of post 58. The outer end of piston 82 of cylinder 80 is pivotally secured to clevis 84 which is secured to auger tube 66 (FIG. 2).

A conventional hydraulic pump 86 is mounted on cross member 44 as is hydraulic control panel 88 which is connected to the hydraulic pump by conventional means. Hoses 90 extend from control panel 88 to the upper ends of cylinder posts 30 so that the lower ends 32 thereof can be hydraulically raised or lowered. This in turn permits the wheels 34 to be raised or lowered with respect to the support platform 14. Hoses 92 connect the control panel 88 witch a hydraulic motor (not shown) in the lower end of auger tube 66 whereby the auger therein is rotated within the tube. A hose 92 extends from control panel 88 to the lower end of cylinder 80 to cause piston rod 82 to be selectively retracted into cylinder 80 to raise the auger 64 with respect to swivel connection 78. When the lifting hydraulic power conveyed to cylinder 80 through hydraulic hose 94 is removed, the weight of the auger conveyor will permit the auger conveyor to move in a downward direction.

A conventional pallet 96 is used to support a rectangular bulk seed container 98. Container 98 has a discharge port 100 which can be opened and closed by a conventional slide gate 102. When the discharge port is opened by lifting the slide gate 102, the bulk seed 104 will flow by gravity outwardly through port 100.

Figure 5:
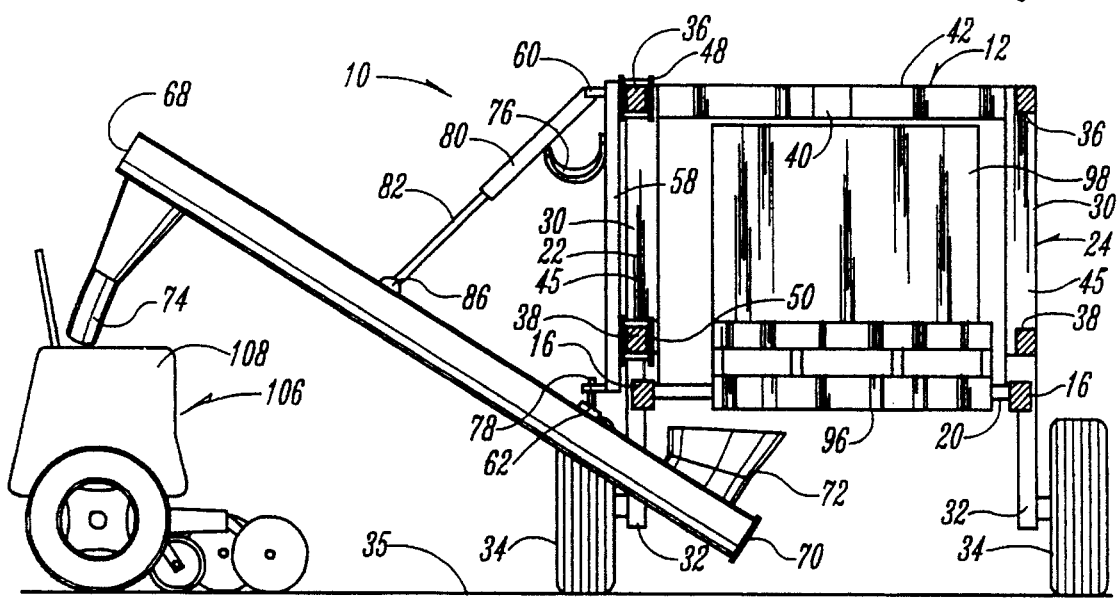
FIG. 5 is an end elevational view of the device of this invention shown in its unloading position.

A conventional field planter 106 is shown in FIG. 5. Planter 106 typically would have a plurality of seed hoppers 108 to accommodate a plurality of seed planting assemblies for a plurality of crop rows.

Figure 4:
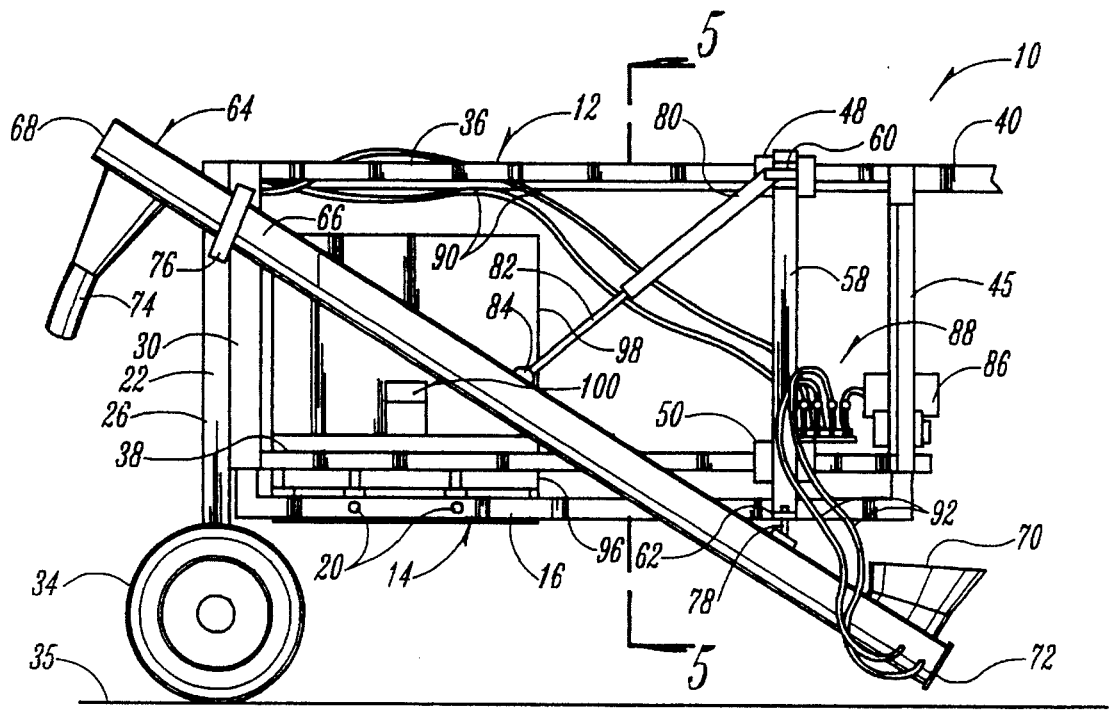
FIG. 4 is a side elevational view similar to that of FIG. 2 but shows the vehicle in its transport position.
Figure 6:
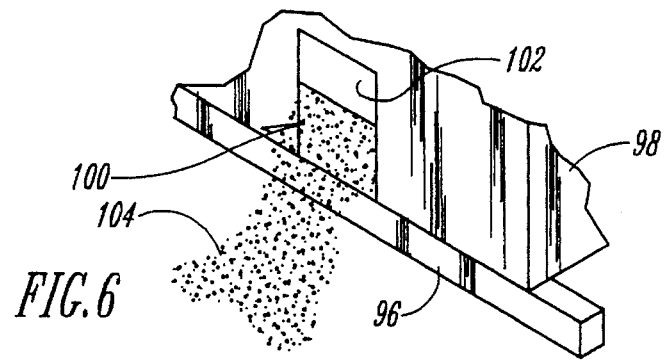
FIG. 6 is a partial perspective view of the discharge port of the bulk seed container.

The normal operation of the invention is as follows: The cylinder posts 30 are operated in the manner described to raise the lower ends 32 upwardly into the posts 30 so that the wheels 34 will be moved to the position shown generally in FIG. 2. This places the support platform 14 essentially at the level of the ground surface 35. A conventional loader will lift the pallet 96 with the loaded bulk seed container 98 through the open space 110 existing between posts 26. The pallet and the container are deposited on the support platform 14. The hydraulic power to the cylinder post 30 is then invoked to raise the wheels 34 from the position of FIG. 2 to the transport position of FIG. 4. The loaded vehicle 10 is then pulled to the field location where the planter 106 is located.

The cylinder 80 is thereupon actuated to lift the auger conveyor 64 out of bracket 76. The conveyor 64 can then be manually pivoted from the position shown in FIG. 4 to the general position shown in FIG. 5. The auger can be moved longitudinally with respect to the vehicle by means of the carriage brackets 48 and 50 rolling on the upper and lower rails 36 and 38 to permit the inlet port 72 of the auger to be located adjacent and below the discharge port 100 of the bulk seed container 98. Similarly, the upper end of the conveyor 64 and outlet spout 74 can be moved to register with the position of the planter hopper 108 which is being filled. The cylinder 80 can be actuated to adjust the height of the upper end 68 of the auger so that the outlet spout 74 will be at a suitable height to fill the hopper. The slide gate 102 of discharge port 100 is then opened, and the hydraulic motor of the auger is then actuated. The bulk seed 104 will flow through the discharge port 100, thence upwardly through the auger 64; and thence downwardly through the outlet spout 74 into the hopper 108.

When the first hopper 108 is filled, the conveyor 64 can be pivoted about clevis 58 with the combined operation of cylinder 80 to move the outlet spout 74 adjacent another hopper on the planter. This operation is continued until all of the hoppers on the planter are filled.

It is seen from the foregoing that the vehicle of this invention will easily accommodate the bulk seed containers and permit the contents thereof to be easily and quickly moved to the hoppers of conventional field planters. Thus, this invention will achieve all of its stated objectives.

What is claimed is:

1. The method of filling a field planter from bulk seed containers, comprising:

loading a rectangular bulk seed container containing bulk seeds onto a transport vehicle having a vertical side frame, pivoting and slidably mounting an elongated inclined conveyor in a travel position on said side frame in parallel relation thereto, moving said vehicle to a field location adjacent a field planter, opening said seed container so that said bulk seed will flow by gravity into a lower end of said elongated conveyor, pivoting said inclined conveyor in a transverse direction with respect to said side frame, and sliding said conveyor along said side frame, so that said conveyor can discharge seed into a hopper on said field planter, and operating said conveyor so that said seed will flow continuously from said container through said conveyor and into said hopper.

2. The method of claim 1 wherein said vehicle has a horizontal transport frame that is lowered to a ground level to facilitate loading of said bulk seed container thereon, and then raised to an elevated position for moving said vehicle to said field location.

3. The method of claim 1 wherein said conveyor is moved from the travel position on said vehicle when said vehicle is being moved to said field location, and is then moved with respect to said vehicle to an operating position to receive seed from said container.

4. The method of claim 3 wherein said conveyor has an inlet end that is moved with respect to said vehicle to be aligned with a seed outlet port on said container.

5. The method of claim 1 wherein said conveyor has an outlet end that is progressively moved to a discharge position adjacent a plurality of seed hoppers on said field planter.

6. A vehicle for filling field planters from bulk seed containers, comprising, a vehicle frame comprising a longitudinally extending lower horizontal seed container support platform and a substantially vertical side frame extending upwardly from said support platform, an inclined conveyor swingably and longitudinally movably secured to said side frame and movable from an inclined travel position folded in parallel relation to and against said side frame to a transverse angular unloading position with respect to said side frame, said conveyor having a lower inlet end and an upper discharge end, with said inlet end dwelling underneath said support platform when said conveyor is in said unloading position, track means on said side frame and connected to said conveyor to permit said conveyor to be moved longitudinally with respect to said side frame, and power means on said vehicle frame and connected to said conveyer for operating said conveyer and for moving said conveyer with respect to each side frame.

7. The vehicle of claim 6 wherein wheels are secured to said vehicle frame to support said vehicle on a ground surface, and second power means connecting said vehicle and said vehicle frame to raise and lower said vehicle frame with respect to said ground surface.

8. The vehicle of claim 7 wherein the lower inlet end of said conveyer is located below the level of said support platform when said vehicle frame is raised to its uppermost position.

9. The vehicle of claim 6 wherein said conveyer is so positioned on said side frame to permit said inlet end to be moved to a position below the level of said support platform to receive seed flowing by gravity from an outlet port on a seed container supported on said platform.

10. The vehicle of claim 9 wherein said track means comprises a pair of spaced upper and lower horizontal rails, a carriage bracket on said rail, a vertical post secured to and extending between said brackets, said conveyer pivotally secured to the lower end of said post, a hydraulic cylinder means having upper and lower ends with said upper end being secured to said bracket on said upper rail, and with said lower end of said cylinder means being secured to said conveyer to pivotally raise or lower said conveyer about its pivotal connection to the lower end of said post.

* * * * *